Patented July 10, 1934

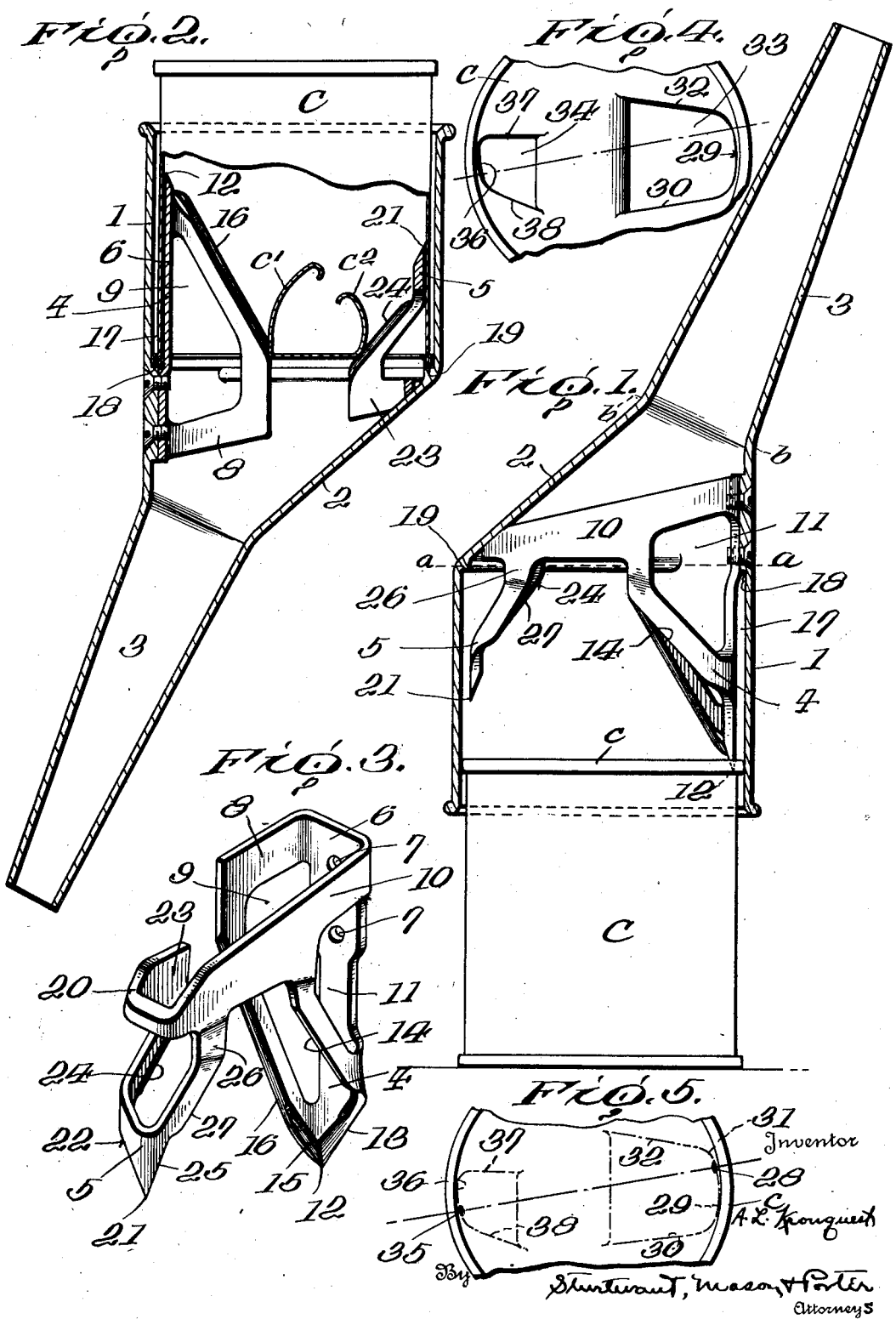

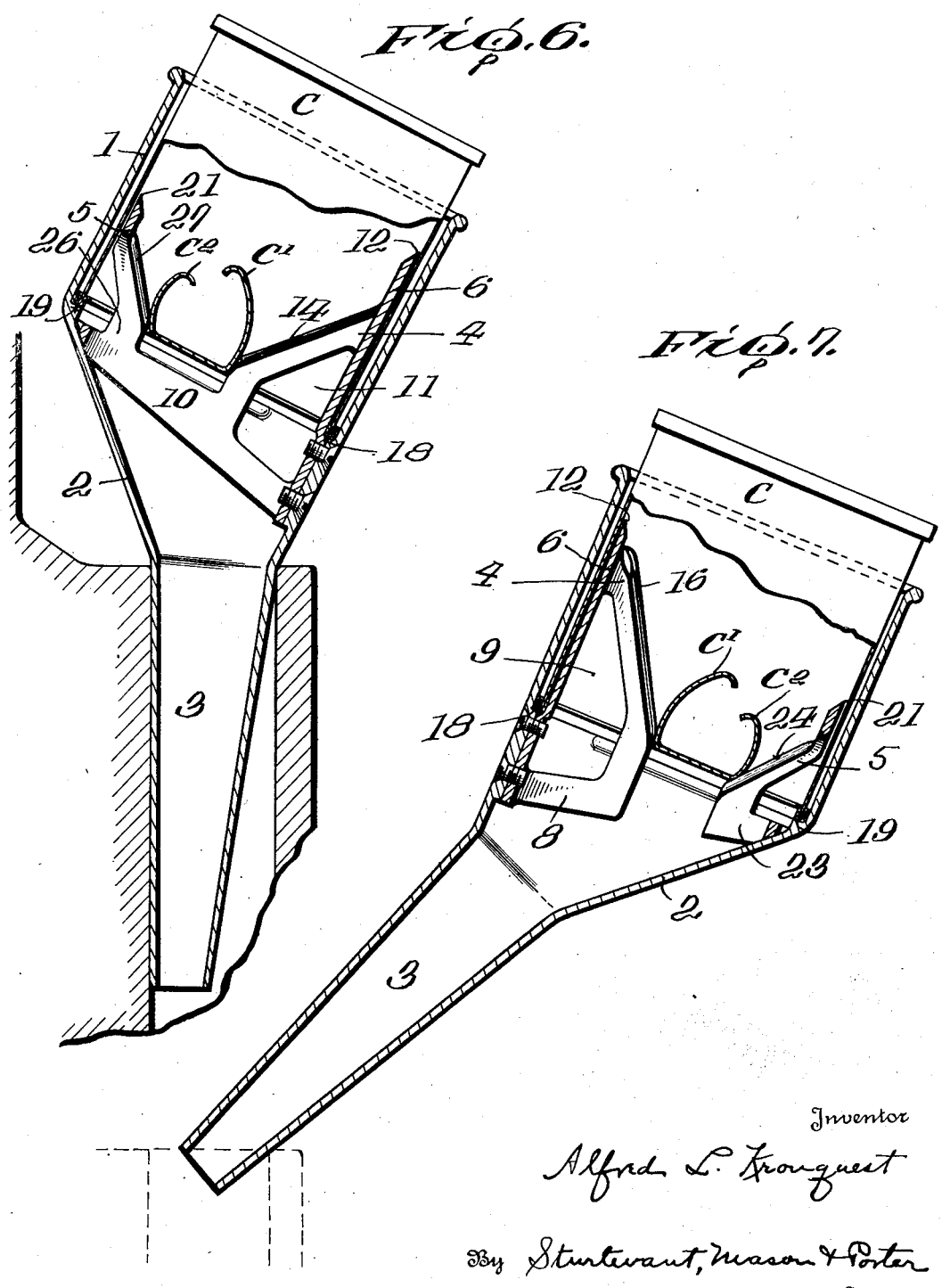

1,966,350

UNITED STATES PATENT OFFICE 1,966,350

DISPENSING FUNNEL FOR CONTAINERS

Alfred L. Kronquest, Syracuse, N. Y., assignor to Continental Can Company, Inc., New York, N. Y., a corporation of New York Application May 27, 1933, Serial No. 673,299

4 Claims. (Cl. 221—23)

The invention relates to new and useful improvements in a dispensing funnel for hermetically sealed containers. In my prior application Serial No. 612,110, filed May 18, 1932, there is shown, described and claimed a dispensing funnel having a body portion with a pouring spout located at one side thereof and extending at an angle to the longitudinal axis of the body portion. Within the body portion is a cutter for cutting the metal in the end of the container when the funnel is inverted and forced down on to the container. The present invention is an improvement on the construction shown in my prior application. An object of the present invention is to provide a cutter which is so shaped and disposed as to penetrate the metal in the end of the container at a slight distance back from the double seam, and at the same time, cut the metal of the end on a line which leads to the double seam, along the same, and then away from the double seam, so as to insure that the cutter point will contact with the container end back from the double seam, thus avoiding striking the double seam, and cut the metal all the way up to the double seam, so as to prevent trapping of the oil when it is poured from the opening.

A further object of the invention is to provide an oil dispensing device of the above type with a second cutter which forms an opening in the container end substantially diametrically opposed to the opening formed by the first-named cutter, and wherein said cutters are arranged so that the penetrating points contact in succession with the end of the container.

In the drawings which show by way of illustration one embodiment of the invention:

Figure 1 is a view in vertical section through the oil dispensing funnel embodying the invention.

Fig. 2 is a vertical sectional view of the dispensing funnel after the container has been cut and the funnel returned to righted position.

Fig. 3 is a perspective view of the cutters.

Fig. 4 is a plan view of the upper end of a container having the openings cut therein by the dispensing funnel.

Fig. 5 is a view similar to Fig. 4, before the metal is severed and showing in broken lines the openings.

Fig. 6 is a view similar to Fig. 2 but showing the funnel and container positioned so that the oil will finally drain through the opening formed by the cutter directly over the spout.

Fig. 7 is a view showing the container and funnel positioned so that the oil will finally drain through the opening formed by the cutter at the opposite side of the funnel.

The invention is directed to an improvement in the oil dispensing device shown, described and claimed in my copending application above referred to. The principal features of novelty in the present device reside in the construction and arrangement of the cutter which severs the end of the container, the provision of two cutters operating to successively contact with the container end at diametrically opposed regions for forming two openings through the end and the manner of supporting the cutters in the dispensing funnel. It is thought the invention will be better understood by a detail description of the present illustrated embodiment thereof.

The dispensing funnel includes a body portion 1 which is slightly larger in diameter than the overall diameter of an hermetically sealed container in which the lubricating oil is marketed. The oil is put up by the original dispensers in these sealed packages, which may be of any desired size, but the body portion 1 of the funnel used for dispensing the oil is proportioned so as to correspond with the container with which it is to be used. Extending from the body portion 1, which terminates substantially on the line a—a, is an irregular cone-shaped portion 2 extending substantially to the line b—b. Attached to this cone-shaped portion is a delivery spout 3. The portion 2 is so shaped and the spout 3 so positioned that the longitudinal axis of the spout cuts the longitudinal axis of the body portion at an acute angle. The spout is also positioned at one side of the body portion and inclines outwardly away from the body wall. This particular shaping of the dispensing funnel is for the purpose of discharging the oil from the container directly into the portion 2 and therefrom into the spout, in such a way that the oil will flow through and from the funnel as fast as it is discharged from the container.

Located within the body portion of the container are two cutters 4 and 5. The cutter 4 is formed as an integral part of a supporting plate 6 having openings 7, 7 therethrough. The plate 6 is provided with a winged section 8 having an opening 9 therethrough. It is also provided with a winged section 10 having an opening 11 therethrough. The penetrating point 12 of the cutter is located at one side of the main supporting section 6 of the plate. The cutter 4 is provided with a cutting edge 13 leading from the penetrating point upwardly as viewed in Figures 1 and 3, and thence along the outer edge of the winged portion 10, as indicated at 14. There is also a cutting edge extending from the penetrating point 12 to the other side thereof as indicated at 15, and this cutting edge leads along the wing 8 as indicated at 16. The supporting plate 6 is offset inwardly from the shank portion thereof containing the openings 7, 7. The inner wall of the dispensing funnel is provided with a thickened portion just beyond the body portion 1, thus forming a space 17 between the cutter and the wall of the funnel, with a shoulder 18 that limits the movement of the funnel on to the container. There is a shoulder 19 formed at the upper end of the body portion, as viewed in Fig. 1, at the opposite side of the mounting for the cutter, and this shoulder extends only part way around the body portion, thus leaving an unobstructed space where there are no shoulders to interfere with the free outlet flowing of the oil that may accumulate in the body portion of the funnel.

The winged portion 10 is extended and carries the cutter 5 and serves as the sole support therefor, except that the winged portion has a shoulder 20 which bears against the tapered wall of the cone-shaped portion 2 of the funnel. The cutter 5 has a penetrating point 21 with a cutting edge 22 leading therefrom and along the edge of the winged portion 23, as indicated at 24. There is also a cutting edge 25 extending from the penetrating point 21 at the opposite side thereof, which leads into the wing 26 as indicated at 27. This cutter 5 has a cut-away section extending into the wings.

The funnel is inverted and slipped down over the container as indicated in Fig. 1. In this figure, the container is indicated at C, and the end seam joining the end to the container body at c. The funnel is so dimensioned as to slip down over the container with just sufficient clearance to permit the easy placement of the funnel on the container and insure that the double seam joining the end of the container to the body portion will pass between the cutter 4 and the wall of the container. The penetrating point 12 is located so that it penetrates the container end a short distance away from the double seam, as indicated at 28 in Fig. 5. The cutting edge 13 is so shaped that the metal will be severed along a line which approaches the double seam and extends along the double seam as indicated at 29 in this figure. Then the cutting edge 14 becomes active to cut the metal along the line 30. At the same time, the cutting edge 15 severs the metal from the point indicated at 28 along the line 31, and then the cutting edge 16 becomes active to cut the metal along the line 32. This severs the metal in the container end and causes the severed portion to be rolled downwardly and inwardly as indicated at $c^1$ in Fig. 2. The opening thus formed extends close to the double seam and along the double seam, so that there is no oil trapped when the container is inverted and the oil dispensed through the opening. The opening thus formed is indicated at 33 in Fig. 4 of the drawings. There is an opening 34 formed in the container end by the cutter 5 before the funnel is fully forced down on to the container. The penetrating points 12 and 21 are so disposed that they come into contact with the container end in succession. The penetrating point 21 and the cutting edges leading therefrom, are shaped similar to the penetrating point 12, and the cutting edges associated therewith, and these penetrating points are so disposed that the container end will be penetrated by the point 21 at a point substantially diametrically opposite the point 28, as indicated at 35 in Fig. 5. The cutter 5 will cut the metal along the line 36 which approaches the double seam, and thence along the line 37. It will also cut the metal along the line 38 and the metal will be rolled downwardly and inwardly as indicated at $c^2$.

It is thought that the manner of using the dispensing funnel will be obvious from the description which has been given above. The container is placed on a solid foundation, such as the coping at a gas station adjacent the pump. The funnel is inverted and slipped over the container as indicated in Fig. 1. The spout may serve as a handle to aid the operator in the placing of the funnel, and the operator pressing downward on the funnel can easily cause the cutting knives to penetrate the end of the container, and cut the same in the manner indicated above. By placing the penetrating points of the knives so that the initial penetration of the end is slightly back from the double seam, there is no danger of the penetrating point striking the double seam through some irregularity in the shaping of the container. After the penetrating point has made its initial entrance through the container end, then the cutting line approaches the double seam and extends along the same. After the funnel has been forced down onto the container until the double seam contacts with the shoulders 18 and 19, then the funnel with the container therein is inverted and the spout placed in the oil receiving nozzle of the crank casing for dispensing the oil.

In Fig. 6 of the drawings, the funnel with the container therein is positioned with the cutter 4 at the low side so that the final draining of the contents of the container will pass through the opening formed by this cutter 4.

In Fig. 7, the funnel with the container therein, is positioned so that the cutter 5 is at the low side and the contents of the container will finally drain through this opening. By providing the two openings, less care is necessary to position the funnel with the container therein so that the entire contents will be drained without trapping any oil in the container. This enables the funnel to be readily used with different types of engines with the receiving pipes located at various positions relative to the engine block. The funnel may be allowed to rest in the receiving pipe of the crank casing while oil is draining therefrom and this frees the operator for other duties. The oil will be quickly dispensed into the crank casing for the reason that there are two openings through which the oil may pass into the funnel until it comes to the final draining point and then the oil will drain through one opening.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A dispensing funnel for hermetically sealed containers comprising a body portion adapted to receive and house the greater portion of a container, a pouring spout attached to said body portion at one side thereof, a cutter housed within said body portion and fixed thereto, said cutter having a penetrating point and cutting edges of different extent leading therefrom, said cutter point being so disposed and shaped relative to the adjacent cutting edges that the penetrating point enters the container end a short distance from the double seam whereupon one of said cutting edges cuts said end on a line leading from said entering point close to the double seam, and thence transversely away from the double seam, the other cutting edge of said cutter cutting said end on a line leading away from said penetrating point transversely of said double seam and substantially parallel and spaced from the line formed by the first cutting edge, said cutter also having means for rolling the severed section of metal between the cutting lines downwardly and inwardly so as to form an unobstructed opening through the container end.

2. A dispensing funnel for hermetically sealed containers comprising a body portion adapted to receive and house the greater portion of a container, a pouring spout attached to said body portion at one side thereof, a cutter housed within said body portion of the funnel and fixed thereto, said cutter having a penetrating point and cutting edges leading therefrom, said cutter having wing members substantially parallel and provided with cutting edges leading into the cutting edges adjacent the penetrating point, the side walls of said wing members being formed with openings therethrough, said penetrating point of the cutter being disposed at one side of the center of the cutter so as to enter the container end a short distance from the double seam, the longer cutting edge at one side of said penetrating point being disposed so as to cut the end along a line extending close to the double seam and thence away from the double seam.

3. A dispensing funnel for hermetically sealed containers comprising a body portion adapted to receive and house the greater portion of a container, a pouring spout attached to said body portion at one side thereof, a cutter housed within the body portion of the funnel and fixed thereto, said cutter having a penetrating point and cutting edges leading therefrom, said cutter having wing members with cutting edges thereon leading into the cutting edges adjacent the penetrating point, one of said wing members being extended across the funnel to the opposite side thereof, a second cutter carried by said wing extension and including a penetrating point with cutting edges leading therefrom, and wing members carried by the cutter and having cutting edges leading into the cutting edges adjacent the penetrating point of said last-named cutter.

4. A dispensing funnel for hermetically sealed containers comprising a body portion adapted to receive a container, a pouring spout attached to said body portion, a cutter housed within the body portion of the funnel and fixed thereto, said cutter having a central portion and parallel wing portions extending therefrom, said central portion being provided with a penetrating point and said central portion and wing portions having cutting edges leading away from said penetrating point for progressively cutting the end when the funnel is forced down onto the container, one of said wing portions being extended across the funnel to the opposite side thereof, and a second cutter carried by said wing extensions and including a similar penetrating point with cutting edges leading therefrom for progressively cutting the container at the opposite side thereof.

ALFRED L. KRONQUEST.